(12) United States Patent
Rossi et al.

(10) Patent No.: US 11,485,134 B2
(45) Date of Patent: Nov. 1, 2022

(54) DATA PACKETS COMPRISING RANDOM NUMBERS FOR CONTROLLING FLUID DISPENSING DEVICES

(71) Applicant: Hewlett-Packard Development Company, L.P., Spring, TX (US)

(72) Inventors: John Rossi, Vancouver, WA (US); Erik D. Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/972,079

(22) PCT Filed: Feb. 6, 2019

(86) PCT No.: PCT/US2019/016734
§ 371 (c)(1),
(2) Date: Dec. 4, 2020

(87) PCT Pub. No.: WO2020/162894
PCT Pub. Date: Aug. 13, 2020

(65) Prior Publication Data
US 2021/0354454 A1 Nov. 18, 2021

(51) Int. Cl.
*B41J 2/045* (2006.01)
*G06F 7/58* (2006.01)

(52) U.S. Cl.
CPC ....... *B41J 2/04546* (2013.01); *B41J 2/04541* (2013.01); *B41J 2/04548* (2013.01); *B41J 2/04573* (2013.01); *G06F 7/588* (2013.01)

(58) Field of Classification Search
CPC .................................................... B41J 2/045
See application file for complete search history.

(56) References Cited

U.S. PATENT DOCUMENTS

| | | |
|---|---|---|
| 4,026,402 A | 5/1977 | Byrd |
| 4,872,028 A | 10/1989 | Lloyd |
| 5,422,662 A | 6/1995 | Fukushima et al. |
| 5,541,629 A | 7/1996 | Saunders |
| 5,751,302 A | 5/1998 | Rezanka |
| 5,917,509 A | 6/1999 | Becerra et al. |
| 6,176,569 B1 | 1/2001 | Anderson et al. |
| 6,302,507 B1 | 10/2001 | Prakash et al. |

(Continued)

FOREIGN PATENT DOCUMENTS

| | | |
|---|---|---|
| CN | 1727186 A | 2/2006 |
| CN | 1922019 A | 2/2007 |

(Continued)

OTHER PUBLICATIONS

Hewlett-Packard Development Company, L.P., Int. Appl. No. PCT/US2019/016735 entitled Issue Determinations Responsive to Measurements filed Feb. 6, 2019 (29 pages).

(Continued)

*Primary Examiner* — Shelby L Fidler
(74) *Attorney, Agent, or Firm* — Trop Pruner & Hu PC

(57) ABSTRACT

In some examples, a fluid dispensing device includes a reservoir containing a fluid, fluidic actuators, and an interface to receive a data packet comprising information to control activation of the fluidic actuators, the data packet comprising a random number generated by a random number generator.

16 Claims, 6 Drawing Sheets

(56) References Cited

U.S. PATENT DOCUMENTS

| | | | |
|---|---|---|---|
| 6,616,256 B1 * | 9/2003 | Cook | B41J 2/04541 347/19 |
| 6,698,862 B1 | 3/2004 | Choi et al. | |
| 7,104,624 B2 | 9/2006 | Schloeman et al. | |
| 7,159,959 B2 | 1/2007 | Schremp | |
| 7,419,236 B2 | 9/2008 | Masuda | |
| 7,578,569 B2 | 8/2009 | Silverbrook | |
| 7,738,137 B2 | 6/2010 | Graf et al. | |
| 7,758,141 B2 | 7/2010 | Sakurai | |
| 7,866,778 B2 | 1/2011 | Silverbrook et al. | |
| 7,976,115 B2 | 7/2011 | Gibson et al. | |
| 8,199,342 B2 | 6/2012 | Martin | |
| 8,348,373 B2 | 1/2013 | Martin et al. | |
| 8,353,567 B1 | 1/2013 | Banerjee et al. | |
| 8,556,364 B2 | 10/2013 | Hoisington et al. | |
| 8,777,364 B2 | 7/2014 | Carrobe et al. | |
| 8,864,260 B1 | 10/2014 | Ge | |
| 9,415,585 B1 | 8/2016 | Goyen et al. | |
| 9,597,894 B2 | 3/2017 | Buxton et al. | |
| 9,776,395 B2 | 10/2017 | Anderston et al. | |
| 11,364,719 B2 * | 6/2022 | Gardner | B41J 2/04543 |
| 2004/0104973 A1 | 6/2004 | Huang | |
| 2004/0183842 A1 | 9/2004 | Kobayashi | |
| 2005/0110814 A1 * | 5/2005 | Imai | B41J 2/04563 347/5 |
| 2005/0190217 A1 | 9/2005 | Wade | |
| 2006/0092437 A1 | 5/2006 | Martin | |
| 2006/0109296 A1 | 5/2006 | Shamoun et al. | |
| 2007/0095928 A1 | 5/2007 | Balinsky et al. | |
| 2009/0278879 A1 | 11/2009 | Takeuchi | |
| 2010/0124329 A1 | 5/2010 | Lyman | |
| 2014/0078223 A1 | 3/2014 | Ohmura | |
| 2014/0111570 A1 | 4/2014 | Nitta et al. | |
| 2014/0320558 A1 | 10/2014 | Ge | |
| 2015/0124019 A1 | 5/2015 | Cruz-Uribe et al. | |
| 2015/0266324 A1 * | 9/2015 | Qu | B41J 2/315 347/190 |
| 2016/0089885 A1 * | 3/2016 | Edelen | B41J 2/14072 347/50 |
| 2017/0239944 A1 | 8/2017 | Martin | |
| 2017/0242633 A1 | 8/2017 | Martin et al. | |
| 2017/0320320 A1 | 11/2017 | Martin et al. | |
| 2018/0050537 A1 | 2/2018 | Bakker et al. | |
| 2018/0147839 A1 | 5/2018 | Ge | |
| 2018/0236761 A1 | 8/2018 | Taniguchi | |
| 2018/0236762 A1 | 8/2018 | Negishi | |
| 2018/0288276 A1 * | 10/2018 | Sato | B41J 2/04563 |
| 2021/0206164 A1 | 7/2021 | Gardner | |
| 2021/0213731 A1 | 7/2021 | Linn | |
| 2021/0221120 A1 | 7/2021 | Linn | |

FOREIGN PATENT DOCUMENTS

| | | |
|---|---|---|
| CN | 101092076 A | 12/2007 |
| CN | 107206816 A | 9/2017 |
| EP | 0972374 | 1/2000 |
| EP | 1212197 B1 | 11/2006 |
| JP | H02208052 A | 8/1990 |
| JP | 2004-282330 A | 10/2004 |
| JP | 2004-343468 A | 12/2004 |
| JP | 2005-205770 A | 8/2005 |
| JP | 2007-525342 A | 9/2007 |
| JP | 2009-292148 A | 12/2009 |
| JP | 2011-075387 A | 4/2011 |
| JP | 2016-032872 A | 3/2016 |
| JP | 2016165822 A | 9/2016 |
| JP | 2018-505077 A | 2/2018 |
| TW | 200533107 A | 10/2005 |
| TW | 201346749 A | 11/2013 |
| TW | 201601509 A | 1/2016 |
| WO | WO-2016089371 A1 | 6/2016 |
| WO | WO-2016130157 A1 | 8/2016 |
| WO | WO-2017180142 A1 | 10/2017 |
| WO | WO-2018071034 A1 | 4/2018 |
| WO | WO-2018080479 A1 | 5/2018 |
| WO | WO-2018080480 A1 | 5/2018 |
| WO | WO-2018190855 | 10/2018 |
| WO | WO-2019009902 A1 | 1/2019 |
| WO | WO-2019017951 A1 | 1/2019 |

OTHER PUBLICATIONS

What is a Kelvin connection and when should it be used? Dated on or before Jan. 2019 (2 pages).

Wikipedia, Four-terminal sensing last edited Sep. 16, 2018 (3 pages).

* cited by examiner

602

Serially input, into a shift register in a fluid dispensing device, a data packet received from a system controller external of the fluid dispensing device, the data packet comprising information to control activation of fluidic actuators of the fluid dispening device, and a random number generated by a random number generator

604

Activate, by a device controller of the fluid dispensing device, an activation signal responsive to detecting an end of the data packet shifted into the shift register, the activation signal to control a timing of activating a fluidic actuator of the fluidic actuators

FIG. 6

DATA PACKETS COMPRISING RANDOM NUMBERS FOR CONTROLLING FLUID DISPENSING DEVICES

BACKGROUND

A fluid dispensing system can dispense fluid towards a target. In some examples, a fluid dispensing system can include a printing system, such as a two-dimensional (2D) printing system or a three-dimensional (3D) printing system. A printing system can include printhead devices that include fluidic actuators to cause dispensing of printing fluids.

BRIEF DESCRIPTION OF THE DRAWINGS

Some implementations of the present disclosure are described with respect to the following figures.

FIG. 6 is a flow diagram of a process according to some examples.

Figure 1:
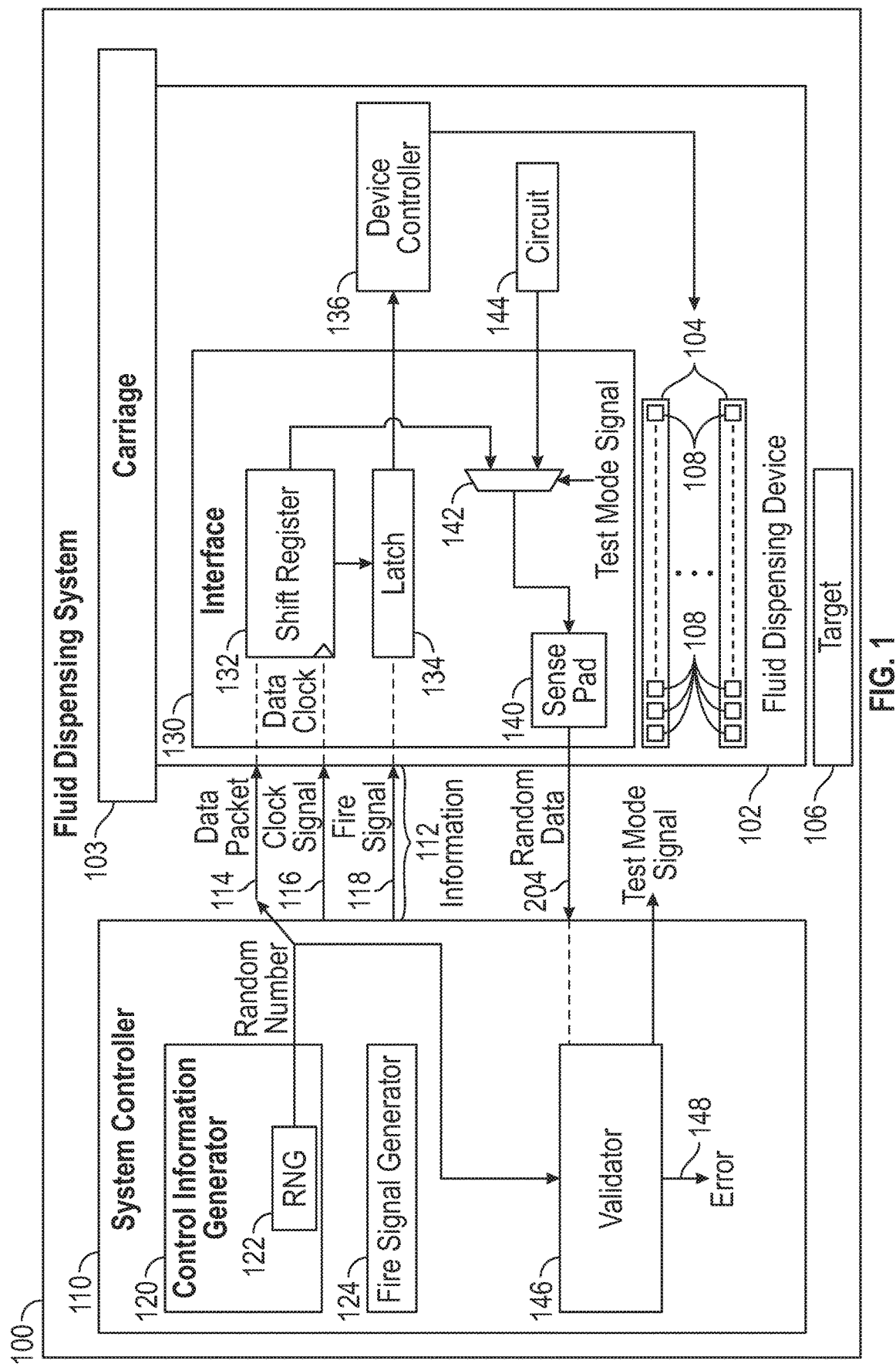
FIG. 1 is a block diagram of a fluid dispensing system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A fluid dispensing device can include fluidic actuators that when activated cause dispensing (e.g., ejection or other flow) of a fluid. For example, the dispensing of the fluid can include ejection of fluid droplets by activated fluidic actuators from respective nozzles of the fluid dispensing device. In other examples, an activated fluidic actuator (such as a pump) can cause fluid to flow through a fluid conduit or fluid chamber. Activating a fluidic actuator to dispense fluid can thus refer to activating the fluidic actuator to eject fluid from a nozzle or activating the fluidic actuator to cause a flow of fluid through a flow structure, such as a flow conduit, a fluid chamber, and so forth.

Activating a fluidic actuator can also be referred to as firing the fluidic actuator. In some examples, the fluidic actuators include thermal-based fluidic actuators including heating elements, such as resistive heaters. When a heating element is activated, the heating element produces heat that can cause vaporization of a fluid to cause nucleation of a vapor bubble (e.g., a steam bubble) proximate the thermal-based fluidic actuator that in turn causes dispensing of a quantity of fluid, such as ejection from an orifice of a nozzle or flow through a fluid conduit or fluid chamber. In other examples, a fluidic actuator may be a piezoelectric membrane based fluidic actuator that when activated applies a mechanical force to dispense a quantity of fluid.

In examples where a fluid dispensing device includes nozzles, each nozzle includes a fluid chamber, also referred to as a firing chamber. In addition, a nozzle can include an orifice through which fluid is dispensed, a fluidic actuator, and a sensor. Each fluid chamber provides the fluid to be dispensed by the respective nozzle.

Generally, a fluidic actuator can be an ejecting-type fluidic actuator to cause ejection of a fluid, such as through an orifice of a nozzle, or a non-ejecting-type fluidic actuator to cause flow of a fluid.

A fluid dispensing device includes an interface to receive control data from a system controller of a fluid dispensing system. In some cases, the interface may experience a functionality issue that may cause the interface to not correctly receive control data from the system controller. For example, the presence of short circuits, open circuits, or other circuit defects or electrical interconnect defects may cause control data to be incorrectly received in the fluid dispensing device. In other cases, the interface may malfunction as a result of vibration induced connectivity issues caused by vibration of the fluid dispensing device during an operation of the fluid dispensing device. In further cases, the interface may malfunction as a result of electrostatic discharge during an operation of the fluid dispensing device.

In some examples, validation of the interface of a fluid dispensing device can be performed prior to an actual operation of the fluid dispensing device (e.g., prior to actual printing in a printing system), or at another time (e.g., when a system including the fluid dispensing device is down for maintenance or service). In such examples, real-time validation of the interface during operation of the fluid dispensing device in actual use is not possible. As a result, malfunctions of the interface of the fluid dispensing device due to operation of the fluid dispensing device may not be detectable.

A fluid dispensing device can also have a large number of fluidic actuators that are operated at relatively high speeds, such that a large number of transitions of data and control signals can occur. Such signal transitions at high frequencies can cause the fluid dispensing device to generate high electromagnetic (EM) emissions that may violate government regulations, industry standards, or other policies.

In accordance with some implementations of the present disclosure, to allow for real-time validation of a fluid dispensing device, techniques or mechanisms provide random numbers in data packets that contain control information for controlling activation of fluidic actuators in a fluid dispensing device. The random numbers are generated by a random number generator, which can be part of a system controller. The random number of a data packet is received by an interface of the fluid dispensing device. The random number received by the interface is in turn output by a sense output of the fluid dispensing device, and received by the system controller. The system controller can then validate whether the random number output by the fluid dispensing device is the same as the random number included in the data packet provided by the system controller to the fluid dispensing device.

In further implementations of the present disclosure, a length of the random number included in a data packet is also randomized. Thus, a first random number in a first data packet may have a random length that differs from a length of a second random number in a second data packet. The time at which the system controller activates an activation signal (also referred to as a fire signal) provided to the fluid dispensing device is based on a time of the end of a data packet. Further, by including random numbers of different lengths in different data packets, the overall lengths of the different data packets vary, which affects the timing of the end of each data packet and thus the timing of the fire signal as well as the overall activation period (also referred to as a fire period). The fire period refers to the overall length of time of a time interval in which the fire signal is activated (including any idle or dead time in which the fire signal in inactive). Randomly varying timings of respective fire signal activations and fire periods refers to a process of dithering fire signal activations and fire periods. As a result, the frequencies of the fire signals for activating the fluidic actuators responsive to the different data packets are spread across a frequency range, which effectively reduces EM emissions as compared to implementations where the frequency of the fire signals is constant across different activation intervals.

FIG. 1 is a block diagram of a fluid dispensing system 100, according to some examples. The fluid dispending system 100 can be a printing system, such as a 2D printing system or a 3D printing system. In other examples, the fluid dispending system 100 can be a different type of fluid dispensing system. Examples of other types of fluid dispensing systems include those used in fluid sensing systems, medical systems, vehicles, fluid flow control systems, and so forth.

The fluid dispensing system 100 includes a fluid dispensing device 102, which can be mounted to a carriage 103 (or other type of support structure) of the fluid dispensing system 100. In some examples, the fluid dispensing device 102 can be in the form of a fluid cartridge (e.g., a print cartridge) that is removably mounted to the carriage 103. In other examples, the fluid dispensing device 102 can be fixedly mounted in the fluid dispensing system 100.

The fluid dispensing device 102 includes a fluid dispensing portion 104 (or multiple fluid dispensing portions 104) for dispensing fluid towards a target 106. In some examples, the carriage 103 and the target 106 are moveable with respect to one another (either the carriage is moveable or the target 106 is moveable or both the carriage and target 106 are moveable).

In some examples, a fluid dispensing portion 104 can be in the form of a fluidic die. A "die" refers to an assembly where various layers are formed onto a substrate to fabricate circuitry, fluid chambers, and fluid conduits. Multiple fluidic dies can be mounted or attached to a support structure. In other examples, a fluid dispensing portion 104 can include a fluidic die sliver, which can be formed of a thin substrate (e.g., having a thickness on the order of 650 micrometers (μm) or less) with a ratio of length to width (L/W) of at least three, for example. A die sliver can other dimensions in other examples. Multiple fluidic die slivers can be molded into a monolithic molding structure, for example.

In a 2D printing system, the fluid dispensing device 102 includes a printhead that ejects printing fluid (e.g., ink) onto a print medium, such as a paper medium, a plastic medium, and so forth.

In a 3D printing system, the fluid dispensing device 102 includes a printhead that can eject any of various different liquid agents onto a print target, where the liquid agents can include any or some combination of the following: ink, an agent used to fuse or coalesce powders of a layer of build material, an agent to detail a layer of build material (such as by defining edges or shapes of the layer of build material), and so forth. In a 3D printing system, a 3D target is built by depositing successive layers of build material onto a build platform of the 3D printing system. Each layer of build material can be processed using the printing fluid from a printhead to form the desired shape, texture, and/or other characteristic of the layer of build material.

A fluid dispensing portion 104 includes an array of fluidic actuators 108. The array of fluidic actuators 108 can include a column of fluidic actuators, or multiple columns of fluidic actuators. The fluidic actuators 108 can be organized into multiple primitives, where each primitive includes a specified number of fluidic actuators. The fluidic actuators 108 can be part of nozzles or can be associated with other types of flow structures, such as fluid conduits, fluid chambers, and so forth. Each fluidic actuator is selected by a respective different address provided by a controller (e.g., a system controller 110) in the fluid dispensing system 100.

As used here, a "controller" can refer to a hardware processing circuit, which can include any or some combination of a microprocessor, a core of a multi-core microprocessor, a microcontroller, a programmable integrated circuit (e.g., application programmable integrated circuit (ASIC), etc.), a programmable gate array, a digital signal processor, a number of discrete hardware components (e.g., timers, counters, state machines, etc.), or another hardware processing circuit. Alternatively, a "controller" can refer to a combination of a hardware processing circuit and machine-readable instructions (software and/or firmware) executable on the hardware processing circuit.

Although FIG. 1 shows the system controller 110 as being one block, it is noted that the system controller 110 can actually represent multiple controllers that perform respective tasks. For example, the system controller 110 can be implemented using multiple ASICs, where one ASIC can be deployed on the carriage 103, and another ASIC can be a main ASIC for controlling fluid dispensing operations (e.g., printing operations).

The system controller 110 sends various information 112 to the fluid dispensing device 102. Although FIG. 1 shows the information 112 being sent by the system controller 110 directly over a link to the fluid dispensing device 102, it is noted that the information 112 can be transferred through an electrical connector of the carriage 103 to the fluid dispensing device 102 in other examples.

The information 112 provided by the system controller 110 to the fluid dispensing device 102 includes a data signal (or multiple data signals) for carrying a data packet 114 to the fluid dispensing device 102. The information 112 also includes a clock signal 116 and a Fire signal 118. In some examples, there can be multiple different clock signals 116. In other examples, the system controller 110 can just provide one clock signal to the fluid dispensing device 102. The information 112 can also include other information (not shown).

The system controller 110 includes a control information generator 120 to generate control information to be included in the data packet 114. As examples, the control information generated by the control information generator 120 includes primitive data and address data. Primitive data is provided in examples where the fluidic actuators 108 in the fluid dispensing device 102 are arranged in primitives. More generally, the primitive data can also be referred to as "fire data," which is data used to control activation or non-activation of a fluidic actuator (or fluidic actuators) within a primitive.

In examples where fluidic actuators 108 are grouped into primitives, the primitive data can include corresponding bits to represent which of the fluidic actuators of a primitive is (are) activated when a fire pulse is delivered to the primitive. A fire pulse corresponds to the Fire signal 118 being activated.

The address data includes address bits that define an address for selecting fluidic actuators 108 to activate. In examples where fluidic actuators 108 are grouped into primitives, each primitive includes a set of fluidic actuators, and the fluidic actuators of the primitive are selected by respective different addresses as represented by the address bits.

The control information can also include other information that can be included into the data packet 114 delivered by the system controller 110 to the fluid dispensing device 102.

In accordance with some implementations of the present disclosure, a random number can also be included into the data packet 114 delivered to the fluid dispensing device 102 by the system controller 110. The random number is generated by a random number generator (RNG) 122.

The RNG 122 can include a pseudo-RNG, whether implemented in hardware or as machine-readable instructions (e.g., software and/or firmware). A pseudo-RNG produces a random number based on a seed provided to the pseudo-RNG. A "seed" is a value that is used to initialize the pseudo-RNG, which then proceeds to produce a collection of random numbers.

The random numbers produced by the RNG 122 can also vary in length. For example, the random numbers produced by the RNG 120 can vary in length among a range of lengths, such as 0 bits, 2 bits, 4 bits, 6 bits, or 8 bits, as examples. A 0-bit random number means that no random number is included in the data packet 114.

The same RNG 122 (or a different RNG) can be used to define the random length of a random number. For example, if the RNG 122 outputs an N-bit (N>1) random number for each activation interval, a first subset of the N bits of the random number can define the random number, while a second subset of the N bits can define the length. The second subset of N bits can be mapped to provide a target distribution of length. For example, for a near uniform distribution (leaning slightly toward zero length), four bits can be allocated to the second subset and values of 0-3 can map to 0-bit length, values of 4-6 can map to 2-bit length, values of 7-9 can map to 4-bit length, values of 10-12 can map to 6-bit length, and values of 13-15 can map to 8-bit length. The mapping and/or size of the mapping (4-bit, 8-bit, or other) can be changed to modify or create a target distribution of lengths, such as a Gaussian distribution, uniform distribution, and so forth.

The fluid dispensing device 102 includes an interface 130 that communicates with the system controller 110. In some cases, the interface 130 can be part of a fluid dispensing portion 104. If there are multiple fluid dispensing portions, there can be multiple corresponding interfaces 130.

In some examples, the interface 130 includes a shift register 132 into which the data packet 114 provided by the system controller 110 is shifted serially one bit at a time. For example, the data packet 114 can be shifted into the shift register 132 on each transition of a Data Clock, which can be one of the clock signals 116 provided by the system controller 110. A shift register includes a chain of storage elements (such as D flip-flops) that successively transfer data bits along the chain of storage elements with transitions of a clock signal (Data Clock in the depicted example). The shift register 132 is an example form of a serial interface at which bits of the data packet 114 are received.

Figure 2A:
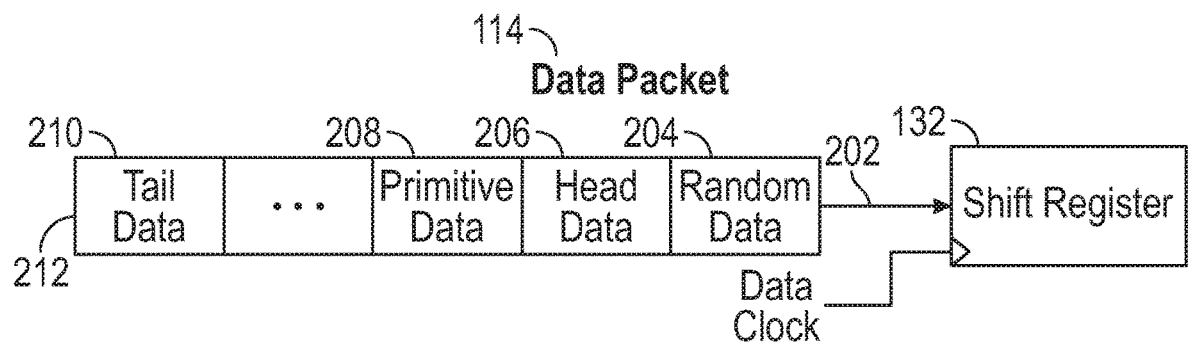
FIG. 2A illustrates a data packet for shifting into a shift register, according to some examples.

FIG. 2A shows an example of a data packet 114, which can be provided by a system controller 110 to the fluid dispensing device 102. The data packet 114 is shifted into the shift register 132, as indicated by arrow 202. The data packet 114 includes a random data 204 as the front portion of the data packet 114. The front portion of the data packet 114 is the first portion of the data packet 114 that is shifted into the shift register 132. The random data 204 includes a random number produced by the RNG 122 of the system controller 110.

In the example shown in FIG. 2A, following the random data 204, the next portion of the data packet 114 includes head data 206. The head data 206 is shifted into the shift register 132 after the random data 204.

In addition, the next portion of the data packet 114 following the head data 206 includes primitive data 208, which can include further control information, including a first subset of the address bits of an address being delivered by the data packet 114. The primitive data 208 is shifted into the shift register 132 after the head data 206.

An end portion of the data packet 114 includes tail data 210, which includes further control information, such as a second subset of the address bits along with other control information. The tail data 210 is shifted into the shift register 132 after all other data of the data packet 114 has been shifted into the shift register 132. The end of the data packet 114 is indicated by 212 in FIG. 2A.

The data packet 114 can include other information (not shown). Also, although a specific order of information elements (204, 206, 208, 210) is shown in FIG. 2A, it is noted that in other examples, the information elements of the data packet 114 can be in a different order. Also, in further examples, different information elements can be included in the data packet 114.

As further shown in FIG. 1, the system controller 110 includes a fire signal generator 124 for controlling an activation of the Fire signal 118. The fire signal generator 124 is able to detect the end 212 of the data packet 114 that is being transferred to the shift register 132 of the interface 130 of the fluid dispensing device 102. In response to detecting the end 212 of the data packet 114, the fire signal generator 124 activates the Fire signal 118.

In some examples, within a fire period, the Fire signal 118 can have two activation pulses: a precursor pulse and a fire pulse. A "pulse" refers to a state of the Fire signal 118 when set active (e.g., active high or active low). The precursor pulse and the fire pulse are two distinct pulses within a fire period, with an idle time (or dead time) between the precursor pulse and the fire pulse. Thus, within a fire period, the Fire signal 118 is activated two times—the first activation produces the precursor pulse, and the second activation produces the fire pulse.

In other examples, the Fire signal 118 can be activated just once within each fire period.

In response to detecting the end 212 of the data packet 114, the fire signal generator 124 activates the Fire signal 118 to produce the precursor pulse. Assuming that the Fire signal 118 is active high, the rising edge of the precursor pulse causes the content of the shift register 132 to be transferred into a latch 134 that is also part of the interface 130. The content transferred to the latch 134 includes control information of the data packet 114.

A "latch" refers to any storage element for buffering data for retrieval by a device controller 136 that is part of the fluid dispensing device 102. In some examples, there may be multiple instances of the device controller 136 in the respective fluid dispensing portions 104.

The device controller 136 can control selective activation of fluidic actuators 118 of a fluid control portion 104 (or multiple fluid control portions 104) based on the control information (primitive data, address, etc.) in the latch 132.

The output end of the shift register 132 is coupled to a sense pad 140 of the interface 130. A "pad" can refer to any electrical connection structure that can be connected to a communication link. In the example of FIG. 1, the sense pad 140 is connected over a communication link to the system controller 110. Although FIG. 1 shows the sense pad 140 being coupled directly over a link to the system controller 110, it is noted that the sense pad 140 can be coupled through a connector of the carriage 103 to the system controller 110.

In the example of FIG. 1, the output end of the shift register 132 is connected to a first input of a multiplexer 142. Another input of the multiplexer 142 can be coupled to another circuit 144 that provides different data. A Test Mode signal can be provided to a select input of the multiplexer 142, to select between the first and second inputs for output to the sense pad 140. If the Test Mode signal is active (high or low), then the first input of the multiplexor 142 is selected to couple the output of the shift register 132 to the sense pad 140. However, if the Test Mode signal is inactive (low or high), then the second input of the multiplexer 142 is selected and coupled by the multiplexer 142 to the sense pad 140.

The Test Mode signal can be provided by the system controller 110, such as by a validator 146 in the system controller 110. Thus, during a test mode (when the Test Mode signal is active), the multiplexer 142 couples the output of the shift register 132 to the sense pad 140. In other examples, the Test Mode signal can be provided by the device controller 136. For example, an internal register configuration in the fluid dispensing device 102 can control the Test Mode signal by the device controller 136.

During the test mode, the random data 204 of the data packet 114 that is shifted out of the shift register 132 is provided to the sense pad 140 for detection by the system controller 110. Note that since the random data 204 is at the front portion of the data packet 114, the random data 204 is the first part of the data packet 114 to be shifted out of the shift register 132 on successive cycles of the Data Clock.

The validator 146 in the system controller 110 receives the random data 204 provided to the sense pad 140 during the test mode. Note that in some cases, a random data of zero bits can be included in the data packet 114, which means that there is no random data in the data packet such that the "random data" 204 output by the sense pad 140 in this scenario is a lack of random data.

The validator 146 knows what random number was provided in the data packet 114 sent by the system controller 110 to the fluid dispensing device 102. For example, the random number generated by the RNG 122 can be provided to the validator 146 (and temporarily stored) for subsequent comparison to a random number included in the received random data 204 from the sense pad 140.

The validator 146 compares the received random data 204 from the sense pad data 140 to the random number from the RNG 122. If the received random data 204 matches the random number from the RNG 122, then the validator 146 can confirm that the interface 130 has not introduced any errors during the receipt of the data packet 114. However, if the received random data 204 does not match the random number from the RNG 122, then the validator 146 can output an error indication 148 of an error in the interface 130. The error indication 148 can be used by the system controller 110 (or a different controller) to send an alert to a user or to another entity, such as a machine or program to take remediation action, such as to shut down the operation of the fluid dispensing system 100 or a different remediation action.

Figure 2B:
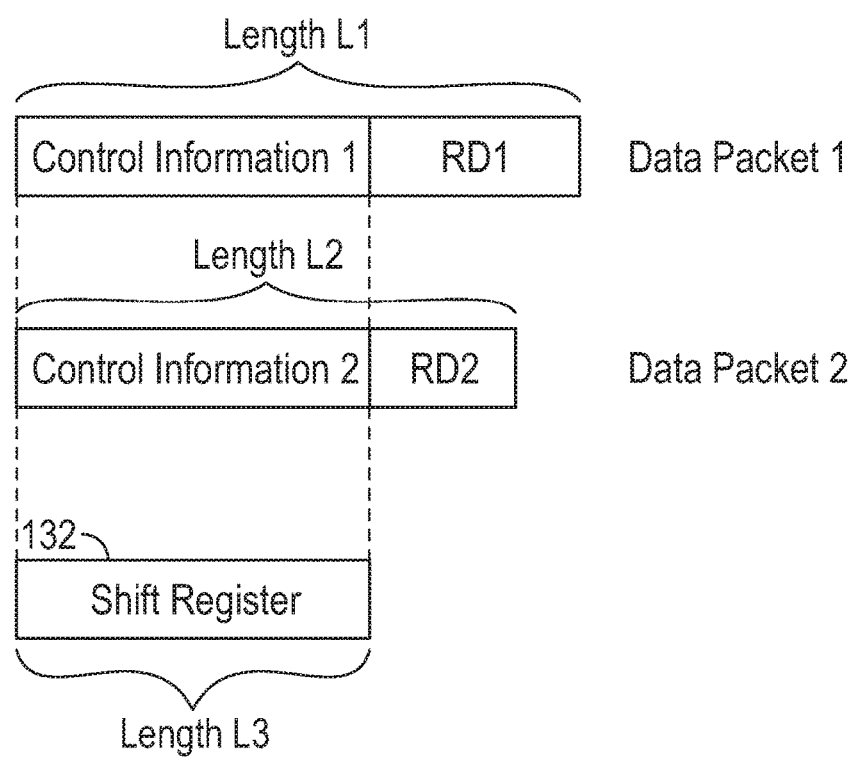
FIG. 2B illustrates data packets with random numbers of different lengths, according to some examples.

FIG. 2B shows an example with two different data packets (data packet 1 and data packet 2). Data packet 1 includes control information 1 (including primitive data, head data, tail data, etc.) along with random data RD1. Data packet 2 includes control information 2 along with random data RD2. In the example of FIG. 2B, the random data RD1 has a length that is longer than the random data RD2. Thus, the overall Length 1 of the data packet 1 is larger than the overall Length 2 of data packet 2.

As further shown in FIG. 2B, in some examples, the shift register 132 has a length (Length 3) that is the length of the control information (e.g., control information 1 or control information 2) of a data packet. The control information of different data packets has the same length. Thus, in some examples, control information 1 in data packet 1 has the same length (Length 3) as control information 2 in data packet 2. The difference in length is in data packets 1 and 2 is due to the difference in lengths of the random data RD1 and RD2.

Thus, since the random data is provided at the front portion of each data packet, the bits of the random data in each data packet would be the first to be shifted out of the shift register 132 as the data packet is shifted into the shift register 132 on successive cycles of Data Clock. Once the end 212 of the data packet is shifted into the shift register 132, any random data that is in the data packet would have been shifted out of the shift register 132.

Figure 3:
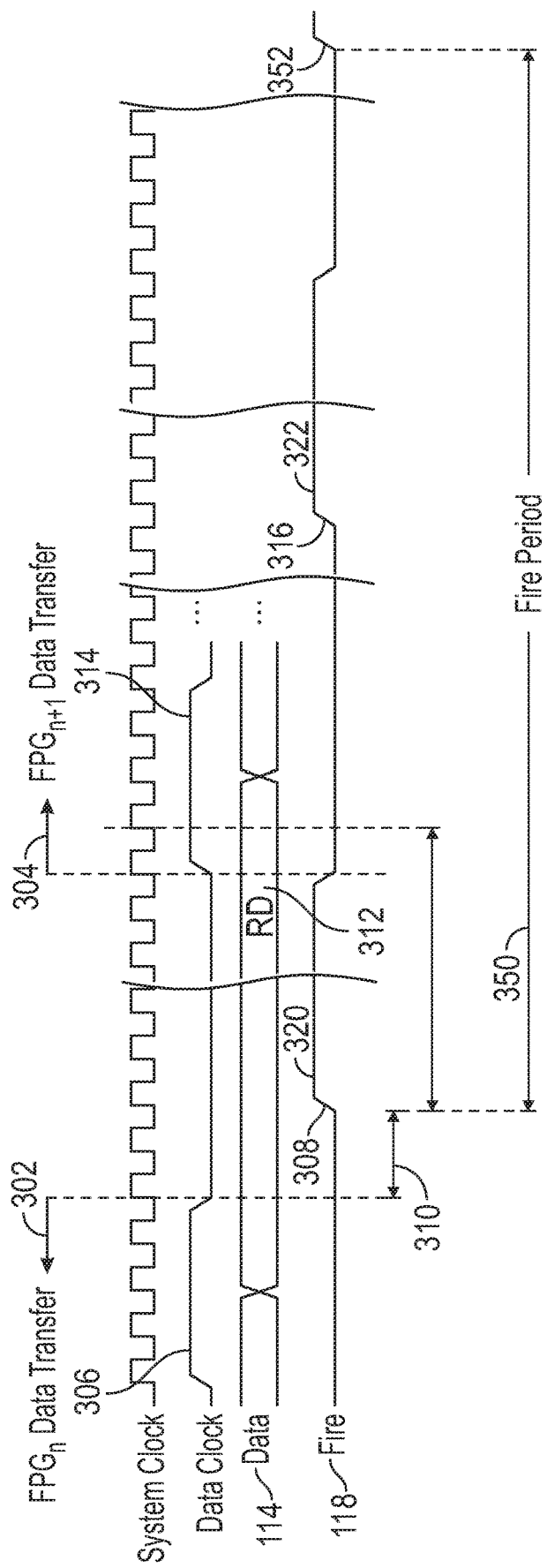
FIG. 3 is a timing diagram illustrating various signals according to some examples.

FIG. 3 is a timing diagram that shows waveforms of various signals, including System Clock, Data Clock, the data signal(s) (over which the data packet 114 is transferred), and the Fire signal 118. System Clock is another clock signal 116 (FIG. 1) generated by the system controller 110. System Clock can run at a higher frequency than Data Clock in some examples.

FIG. 3 shows a data transfer in a activation interval n (or fire period n), and a data transfer in the next activation interval n+1 (or next fire period n+1). In the example of FIG. 3, an activation interval is depicted as a fire pulse group (FPG). Each data packet includes control information for a respective activation interval (e.g., an FPG). In the example of FIG. 3, the data transfer for $FPG_n$ is represented as 302, while the data transfer for the next FPG, $FPG_{n+1}$, is represented as 304.

Data Clock pulse 306 is the last Data Clock pulse for $FPG_n$ (i.e., the Data Clock pulse 306 is the clock that shifts the last bit of the tail data 210 of the data packet 114 (FIG. 2) into the shift register 132).

In the example of FIG. 3, following the shifting of the end 212 of the data packet 114 for $FPG_n$ into the shift register 132 (as indicated by the falling edge of the Data Clock pulse 306, the Fire signal 118 is activated (308) a delay 310 following the falling edge of the Data clock pulse 306. Although FIG. 3 shows a small delay 310 between the falling edge of the Data Clock pulse 306 and a first rising edge 308 of the Fire signal 118 for $FPG_n$, it is noted that the first rising edge 308 of the Fire signal 118 can coincide with the falling edge of the Data Clock pulse 306. In some examples, the delay 310 is equal to two cycles of System Clock.

For the data transfer 304 for the next $FPG_{n+1}$, random data 312 is provided onto the data packet 114 for the next $FPG_{n+1}$, and the data packet 114 is shifted into the shift register 132 in response to the Data Clock pulse 314 for $FPG_{n+1}$.

In some examples, as noted above, the Fire signal 118 can be activated twice in each fire period (e.g., FPG). The first activation (308) of the Fire signal 118 for $FPG_n$ produces a precursor pulse (320) to latch data from the shift register 132 to the latch 134, as shown in FIG. 1. The second activation (316) of the Fire signal 118 for $FPG_n$ produces a fire pulse 322 that causes activation of fluidic actuators in primitives as specified by the primitive data in the data packet for $FPG_n$.

Note that the data transfer of the data packet for $FPG_{n+1}$ can occur during the generation of the precursor and fire pulses 320 and 322 for $FPG_n$.

The length of a fire period is represented by 350 in FIG. 3. The fire period starts with the rising edge 308 of the precursor pulse for $FPG_n$, and ends at a rising edge 352 of the precursor pulse for the next $FPG_{n+1}$. The fire period 350 includes the width of the precursor pulse 320, the width of an idle time between the precursor pulse 320 and the fire pulse 322, the width of the fire pulse 322, and the width an idle time between the fire pulse 322 and the precursor pulse of the next $FPG_{n+1}$.

Variations in the length of the random data included in a data packet causes a variation in the length of the fire period 350. Note that a variation in the length of the random data included in a data packet does not cause variation in the width of the precursor pulse 320, the width of an idle time between the precursor pulse 320 and the fire pulse 322, and the width of the fire pulse 322. However, the variation in the length of the random data included in a data packet causes a corresponding variation in the width an idle time between the falling edge of the fire pulse of a current FPG and the precursor pulse of the next FPG.

Figure 4:
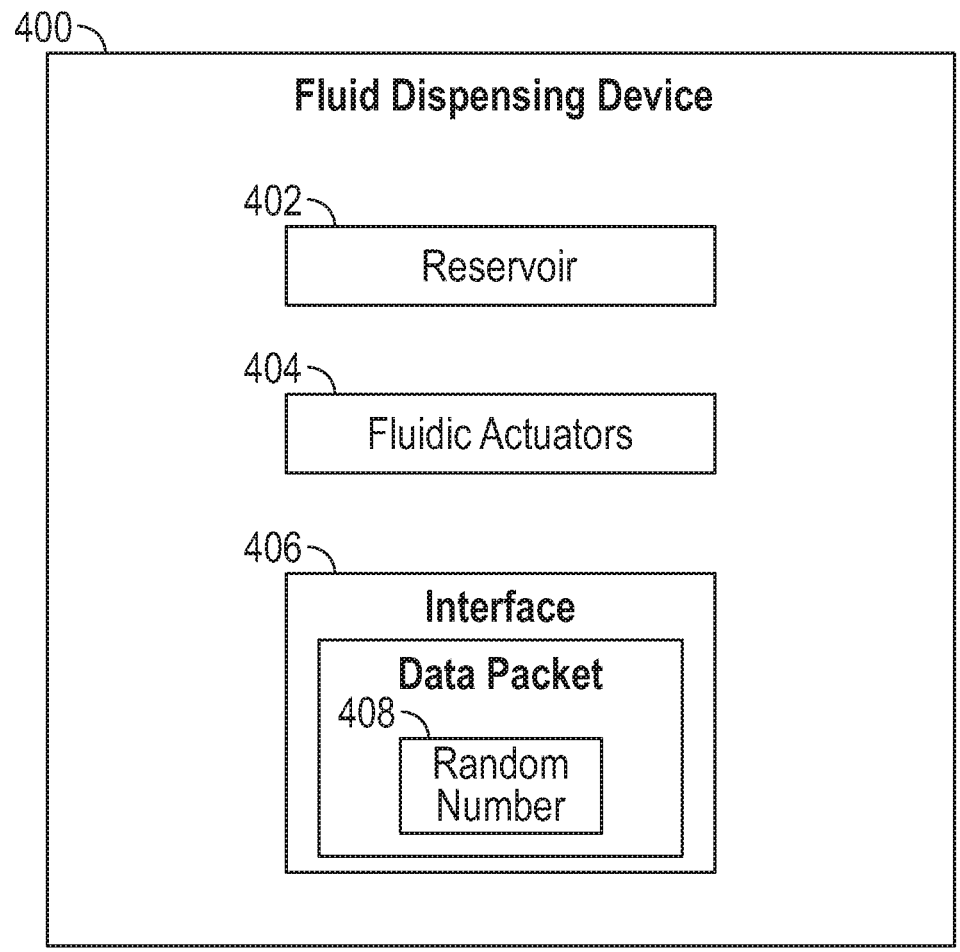
FIG. 4 is a block diagram of a fluid dispensing device according to some examples.

FIG. 4 is a block diagram of a fluid dispensing device 400 (e.g., the fluid dispensing device 102 of FIG. 1), which can be in the form of a fluid cartridge (e.g., print cartridge), for example. The fluid dispensing device 400 includes a reservoir 402 containing a fluid (e.g., a print material). The fluid dispensing device 400 further includes fluidic actuators 404, such as the fluidic actuators 108.

The fluid dispensing device 400 additionally includes an interface 406 to receive a data packet 408 comprising information to control activation of the fluidic actuators, the data packet comprising a random number 408 generated by a random number generator. Additionally, the length of the random number in the data packet is derived randomly.

In some examples, the interface 400 includes a serial interface to receive a series of bits of the data packet. The serial interface can be in the form of a shift register.

In further examples, the fluid dispensing device 400 includes a sense output (e.g., the sense pad 140 of FIG. 1) coupled to the interface 406, the sense output to provide the random number to a controller (e.g., the system controller 110) external of the fluid dispensing device 400, where the provided random number useable by the controller to detect an issue of the fluid dispensing device 400.

Figure 5:
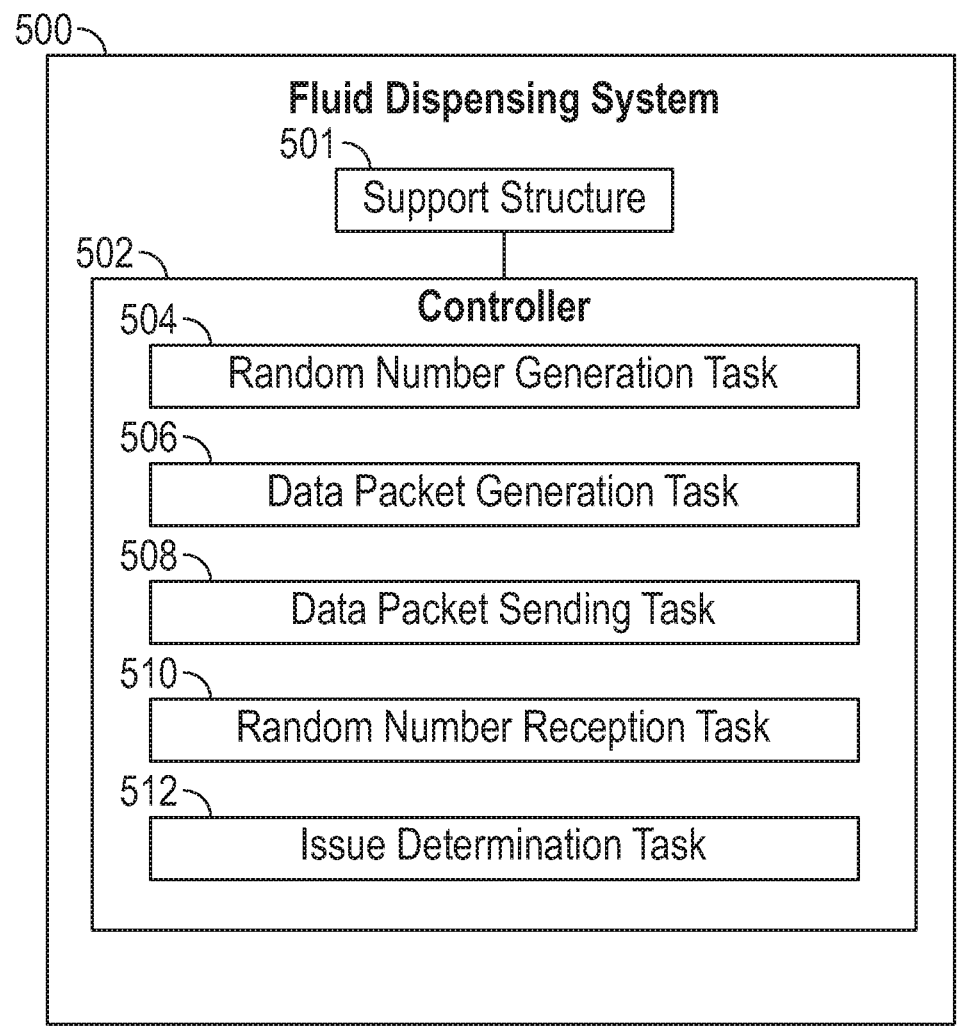
FIG. 5 is a block diagram of a fluid dispensing system according to further examples.

FIG. 5 is a block diagram of a fluid dispensing system 500 that includes a support structure 501 (e.g., the carriage 103 of FIG. 1) to receive a fluid dispensing device. The fluid dispensing system 500 further includes a controller 502 (e.g., the system controller 110 of FIG. 1) to perform various tasks. The controller 502 can perform a random number generation task 504 that generates a random number. The controller 502 further performs a data packet generation task 506 to include the random number and control information (that controls activation of fluidic actuators in the fluid dispensing device) in a data packet.

The controller 502 performs a data packet sending task 508 to send the data packet to the fluid dispensing device, and a random number reception task 510 to receive, from an output of the fluid dispensing device, a version of the random number after the data packet is received by an interface of the fluid dispensing device.

The controller 502 further performs an issue determination task 512 to determine whether an issue is present in the fluid dispensing device in response to a comparison of the generated random number to the version of the random number received from the output of the fluid dispensing device.

In further examples, the controller 502 can derive a length of the random number randomly such that the random number included in the data packet is different from a length of a random number included in another data packet comprising information to control activation of fluidic actuators in the fluid dispensing device.

FIG. 6 is a flow diagram of a process according to some examples. The process of FIG. 6 includes serially inputting (at 602), into a shift register (e.g., 132 in FIG. 1) in a fluid dispensing device, a data packet received from a system controller (e.g., 110) external of the fluid dispensing device, the data packet comprising information to control activation of fluidic actuators of the fluid dispensing device, and a random number generated by a random number generator.

The process of FIG. 6 further includes activating (at 604), by a device controller (e.g., 136) of the fluid dispensing device, an activation signal (e.g., the Fire signal 118) responsive to detecting an end of the data packet shifted into the shift register, the activation signal to control a timing of activating a fluidic actuator of the fluidic actuators.

In examples where the controller 110 or 502 includes machine-readable instructions, the machine-readable instructions can be stored in a non-transitory machine-readable or computer-readable storage medium. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A fluid dispensing device comprising:
a reservoir containing a fluid;
fluidic actuators;
an interface to receive a data packet comprising information to control activation of the fluidic actuators, the data packet comprising a random number generated by a random number generator;
a sense output coupled to the interface;
a shift register to receive the data packet and to output the random number as the data packet is shifted into the shift register; and
a multiplexer comprising a first input connected to an output of the shift register, and a second input connected to a circuit of the fluid dispensing device, the multiplexer when set in a test mode to selectively output the random number to the sense output.

2. The fluid dispensing device of claim 1, wherein the random number is included in a front portion of the data packet.

3. The fluid dispensing device of claim 1, wherein the interface comprises a serial interface to receive a series of bits of the data packet.

4. The fluid dispensing device of claim 3, wherein the serial interface comprises the shift register into which the data packet is shifted serially.

5. The fluid dispensing device of claim 1, wherein a length of the random number in the data packet is derived randomly.

6. The fluid dispensing device of claim 5, wherein a first portion of the random number contains a random value, and a second portion of the random number defines a length of the random number.

7. The fluid dispensing device of claim 1, wherein the sense output is to provide the random number to a controller external of the fluid dispensing device, the provided random number useable by the controller to detect an issue of the fluid dispensing device.

8. The fluid dispensing device of claim 1, wherein the data packet is a first data packet, and the random number in the first data packet has a first length, and wherein the interface is to receive a second data packet comprising information to control activation of the fluidic actuators, the second data packet comprising a random number having a second length different from the first length.

9. The fluid dispensing device of claim 1, wherein a length of the shift register is equal to a length of control information in the data packet, the control information excluding the random number.

10. The fluid dispensing device of claim 9, wherein the control information controls activation of the fluidic actuators.

11. A fluid dispensing device comprising:
a reservoir containing a fluid;
fluidic actuators; and
an interface to:
receive a first data packet comprising information to control activation of the fluidic actuators, the first data packet comprising a first random number of a first length generated by a random number generator, and
receive a second data packet comprising information to control activation of the fluidic actuators, the second data packet comprising a second random number having a second length different from the first length, wherein a respective random number in each respective data packet of the first and second data packets is included in a front portion of the respective data packet;
a shift register to shift each of the first and second data packets through the shift register on transitions of a clock; and
a latch to receive data in the shift register upon activation of a signal, the activation of the signal responsive to an end of a data packet of the first and second data packets shifted into the shift register, and wherein different lengths of the first and second random numbers in the respective first and second packets cause a timing of the activation of the signal to differ.

12. The fluid dispensing device of claim 11, wherein the different lengths of the first and second random numbers in the respective first and second data packets cause fire periods responsive to the first and second data packets to differ.

13. The fluid dispensing device of claim 11, wherein a length of the shift register is equal to a length of control information in a data packet that includes a random number, the control information excluding the random number.

14. The fluid dispensing device of claim 13, wherein the control information controls activation of the fluidic actuators.

15. A method comprising:
serially inputting, into a shift register in a fluid dispensing device, a data packet received from a system controller external of the fluid dispensing device, the data packet comprising information to control activation of fluidic actuators of the fluid dispensing device, and a random number generated by a random number generator, wherein the shift register outputs the random number as the data packet is shifted into the shift register; and
activating, by a device controller of the fluid dispensing device, an activation signal responsive to detecting an end of the data packet shifted into the shift register, the activation signal to control a timing of activating a fluidic actuator of the fluidic actuators; and
setting, in a test mode, a multiplexer comprising a first input connected to an output of the shift register, and a second input connected to a circuit of the fluid dispensing device, the multiplexer when set in the test mode selectively outputting the random number to a sense output of the fluid dispensing device.

16. The method of claim 15, further comprising:
receiving, by the system controller from the sense output of the fluid dispensing device, the random number shifted through the shift register and rolled off an end of the shift register; and
determining, by the system controller, whether an issue is present in the fluid dispensing device in response to a comparison of the random number received from the sense output to the random number generated by the random number generator.

* * * * *